United States Patent
Kuo (10) Patent No.: US 8,544,505 B1
(45) Date of Patent: Oct. 1, 2013

(54) PRE-STRESSED CONCRETE PIPE

(71) Applicant: Ming C. Kuo, Cerritos, CA (US)

(72) Inventor: Ming C. Kuo, Cerritos, CA (US)

( * ) Notice: Subject to any disclaimer, the term of this patent is extended or adjusted under 35 U.S.C. 154(b) by 0 days.

(21) Appl. No.: 13/694,838

(22) Filed: Jan. 10, 2013

(51) Int. Cl.
*F16L 9/00* (2006.01)

(52) U.S. Cl.
USPC ... 138/176; 138/175; 138/DIG. 5; 285/290.1; 285/290.3

(58) Field of Classification Search
USPC ......... 138/109, 175, 176, DIG. 5; 285/290.3, 285/290.1
See application file for complete search history.

(56) References Cited

U.S. PATENT DOCUMENTS

| | | | | |
|---|---|---|---|---|
| 1,254,302 A | * | 1/1918 | Bell et al. | 138/176 |
| 2,660,199 A | * | 11/1953 | Montgomery | 403/12 |
| 2,707,003 A | * | 4/1955 | Kennison | 138/176 |
| 2,808,851 A | * | 10/1957 | James | 138/145 |
| 3,034,536 A | * | 5/1962 | Kennison | 138/176 |
| 3,034,537 A | * | 5/1962 | Seaman et al. | 138/176 |
| 3,742,985 A | * | 7/1973 | Rubenstein | 138/141 |
| 3,911,964 A | * | 10/1975 | Bald | 138/176 |
| 3,963,056 A | * | 6/1976 | Shibuya et al. | 138/175 |
| 3,982,565 A | * | 9/1976 | Iida | 138/176 |
| 4,153,656 A | | 5/1979 | Bunyan | |
| 4,771,530 A | | 9/1988 | Creedon | |
| 4,840,200 A | | 6/1989 | Creedon | |
| 5,065,795 A | * | 11/1991 | Creedon | 138/176 |
| 5,928,447 A | | 7/1999 | GianFrancisco | |
| 6,076,562 A | | 6/2000 | Kuo | |
| 6,123,485 A | | 9/2000 | Mirmiran et al. | |
| 6,155,810 A | | 12/2000 | Thim | |

* cited by examiner

*Primary Examiner* — Patrick F Brinson
(74) *Attorney, Agent, or Firm* — Gordon K. Anderson (57) ABSTRACT

A pre-stressed concrete pipe is taught that incorporates a cylinder (20), an annular ring (34) and an annular offset member (40) welded together. A seal band (44) stretches over the annular offset member and the assembled annular ring is welded within a first end (22) of the metallic cylinder. A strip of pressure sensitive tape (54) seals the internal interface. An O-ring (52) is positioned around the annular ring during joint attachment of a pipeline. The cylinder second end (24) utilizes a hat member (56) and a resilient seal band (44*a*) stretched over the hat member with the assembled hat member welded within the second end of the cylinder. A strip of pressure sensitive tape (54) seals this interface. A film layer of release agent (64) is adhered to the inside of the metallic cylinder where a concrete tube (68) is cast within the cylinder. A pressurized solidifying compound (70) is disposed through annular spaces created between the cylinder inner wall and the offset member and hat member formed between the cylinder and the concrete tube permitting the concrete tube to remain constantly in a tangential compressed state.

20 Claims, 5 Drawing Sheets

FIG. 34

PRE-STRESSED CONCRETE PIPE

CROSS REFERENCE TO RELATED APPLICATION

This application claims priority of Provisional Patent Application Ser. No. 61/744,205 filed Sep. 21, 2013.

TECHNICAL FIELD

The present invention relates to concrete pipes in general. More specifically to a pipe that includes a metallic outer casing and a cast concrete tube inside with a pressurized solidifying compound between the metallic cylinder and the cast concrete tube permitting the tube to remain in compression.

BACKGROUND ART

Previously, many types of concrete pipes have been developed in endeavoring to provide an effective means to pre-stress the concrete employing a metallic reinforcement or a pressurized solidifying compound for compression.

The prior art listed below did not disclose patents that possess any of the novelty of the instant invention; however the following U.S. patents are considered related:

| Pat. No. | Inventor | Issue Date |
| --- | --- | --- |
| 3,982,565 | Iida | Sep. 28, 1976 |
| 4,153,656 | Bunyan | May 8, 1979 |
| 4,771,530 | Creedon | Sep. 20, 1988 |
| 4,840,200 | Creedon | Jun. 20, 1989 |
| 5,065,795 | Creedon | Nov. 19, 1991 |
| 5,928,447 | GianFransisco | Jul. 27, 1999 |
| 6,076,562 | Kuo | Jun. 20, 2000 |
| 6,155,810 | Thim | Dec. 5, 2000 |
| 6,123,485 | Mirmiran et al. | Sep. 26, 2000 |

Iida in U.S. Pat. No. 3,982,565 teaches a method of pre-stressing a concrete pipe by arranging a reinforcing cage in a form and cast expansive concrete within the form such that the reinforcing cage is disposed outwardly of the center of the wall thickness of the concrete layer and then centrifugally forming the pipe.

U.S. Pat. No. 4,153,656 issued to Bunyan is for a method of joining pipes in which a sleeve is placed over the adjacent ends of the pipes to overlap each pipe. The sleeve fits with clearance around the pipe ends. The ends of the clearance space are closed by inflating hollow sealing rings and then epoxy resin is injected into the clearance space. The pressure of the epoxy resin is then raised to a substantially greater pressure than atmospheric with the pressure maintained until the resin sets.

Creedon in U.S. Pat. No. 4,771,530 discloses a method of pre-stressing concrete members using a pressure containing casing positioned around the outside surface leaving a cavity therebetween. A pressurized medium is injected into the cavity at a pressure sufficient to apply the required pre-stress force. The pressurized medium changes form by hardening after injection which includes grout, thermoset plastic and epoxy resin. When the concrete member is cast, a cavity is formed by peeling the concrete member and casing away from each other as the medium is injected.

U.S. Pat. No. 4,840,200 of Creedon teaches a pre-stressed tube having inner and outer walls with an intermediate non-adhering lamina layer. A pressure medium is fluidically injected within the lamina layer and after hardened provide a pre-stress force forming a permanent leak-proof pre-stress force to the tube.

U.S. Pat. No. 5,065,795 issued to Creedon is for a pre-stressed concrete article including overlaying the end of the article and having a gasket ring between the article and the end walls. A hardenable medium is injected between the jacket and the concrete article and generates a sufficient pressure so as to outwardly bulge the jacket, drawing the end walls together thereby compressing the gaskets.

Kuo's U.S. Pat. No. 6,076,562 is my previous patent which disclosed a pre-stressed concrete pipe rolled inside a steel cylinder with a seal joint at each end of the pipe between the pipe outside surface and the inner wall of the steel cylinder. The seal joint incorporates an annular groove to distribute hardenable medium fluid injected from holes through the steel cylindered wall. The fluid penetrates the entire boundary surface between the concrete and the steel pipe under pressure forcing the concrete into compression while the steel cylinder expands outwardly. The seals at the pipe ends prevent the medium from leaking. When the fluid reaches a desirable pressure a check valve on the supply line retains pressure in the pipe while the fluid supply stops. The pipe retains its compression after the medium is hardened.

U.S. Pat. No. 6,123,485 issued to Mirmiran et al. is for fiber reinforced plastic formed about concrete piles and columns which include an extruded shell with interior protruding portions. The concrete filled tubes are enhanced by pre-stressing the concrete core increasing the bond with the tube and placing the tube in an active hoop tension.

For background purposes and as indicative of the art to which the invention is related reference may be made to the remaining cited U.S. Pat. No. 5,928,447 issued to GianFransisco and U.S. Pat. No. 6,155,810 of Thim.

DISCLOSURE OF THE INVENTION

Concrete pipes have little tensile strength but ample compression strength therefore much has been done in pre-stressing concrete pipes with reinforcements such as stretching reinforcing members such as steel bars, rods and wires embedded within the concrete.

The instant invention utilizes a pressurized solidifying compound that has been disposed between a metallic cylinder having a high modulus of elasticity and a concrete tube cast inside permitting the concrete tube inside to remain constantly in a tangential compressed state.

The invention makes the production of pre-stressed concrete pipes very simple, reliable and also allows it to be cost effective to produce a new type of strong concrete pipes in a wide range of sizes regardless of casting processes. Generally concrete pipes are for transporting fluid such as water and sewage however the new method is feasible for making extra large pipes in other utilities.

Generally, there are two types of pipe joints. The first type is a butt weld joint where the metallic cylinder butts against its mating metallic cylinder at the cylinder end and is welded circumferentially to seal the joint. Because the cylinder end protrudes beyond the concrete pipe end, the thermal effects from the butt welds do not disturb the compression on the cast concrete tube. The second type is a seal joint where the metallic cylinder has a male end with an O-ring seal and a female belled end for easy alignment during pipe joining operation so the male end may be inserted into a female end. Sometimes it is practical to make pipes with both male ends with an O-ring seal and join their ends together engaging in a short double belled section.

While the disclosure includes both types of pipe joints in conjunction with its limitations however this does not limit the use with other, or all, pre-stressed concrete pipes using a metallic cylinder on the outside and pre-stressed with a solidifying compound.

To effectively accomplish this pre-stressing, an annular groove is provided for distributing the solidifying compound at each end of the pipe. This groove ensures a uniform distribution of compound around the pipe and consistent pressurization through the entire pipe until the compound is solidified placing the concrete pipe in permanent compression. The groove is formed as a metallic channel having first annular toe flange facing toward the end of the metallic cylinder. A water tight weld bead attaches the toe flange to the inner face of the cylinder ensuring no leaking from joint. The second flange of the channel bonds to the outer face with a resilient seal ring which extends longitudinally beyond the second flange sealing securely when placing the inner face of the seal ring with concrete.

The annular groove in various shaped rings, offset members and formed hat members may be any shape as long as they adequately interface with the end of the metallic cylinder. For a seal joint pipeline, the cylinder has one end attached with a rolled annular ring for mounting a pipe seal which creates an offset between the cylinder and ring. However if the offset is small it should have a hat section annular ring for the utilizing a compound groove. If the offset is large it may be required to use a joggled offset annular groove, which is described in detail hereafter. The annular groove provides at least one entry port for the pressurized solidifying compound.

Bonding of a resilient seal band to the joggled annular offset member and also to the formed hat section may be accomplished using a number of techniques which include stretching over the outside surface of the member or section using an adhesive or vulcanizing with heat and pressure. It is also anticipated that the resilient seal band could be bonded to the inside surface using the same procedure or actually coated directly onto the member or section prior to casting the concrete pipe, however the former is preferred.

A small gap is present between the outer face of the annular groove and the inner face of the cylinder when the concrete sets allowing the compound to flow under longitudinally from the annular groove into the boundary layer gap between the cylinder and the pipe. During pre-stressing, the pressure acts on the outer face of the seal ring preventing the compound from leaking between the inner face of the seal ring and the concrete pipe cast inside insures no leaks on the second end of the groove. Furthermore due to its resilient properties the seal ring will always maintain the sealing action even when the metallic groove deforms caused by the expansion of the cylinder during the pre-stressing.

The use of a metallic cylinder coating the inside with a film layer of release agent and then casting a concrete tube inside is easily accomplished making the process simple and straight forward.

Before pre-stressing the pipe the trapped air in the groove must be relieved through a bleed hole which may be another injection hole, if available, or if not an independent hole may be added. An injection nozzle having an integral check valve not only permits entry of the pressurized solidifying compound between the metallic cylinder and the concrete tube but allows the inlet line to be removed and cleaned before the compound has had time to set.

The injection nozzle assembly is coated with a release agent such that it may be removed from the cylinder after the compound is completely set and then cleaned for future use.

To avoid costly failure due to leaks, each pipe assembly is first tested with water with the same pressure as the compound. If leaks are found around the weld joints they may be repaired and retested.

An advantage of the invention permits a mechanical vibration system may be wrapped around the cylinder at the middle between injection stations assisting the compound to permeate completely through the gap during pre-stressing.

Still another object of the invention permits the concrete tube to be made inside the cylinder by horizontal spinning using centrifugal force or vertical gravitational placing using a mandrel, or the like, which are easily accomplished and are well known in the art.

These and other objects and advantages of the present invention will become apparent from the subsequent detailed description of the preferred and second embodiment and the appended claims taken in conjunction with the accompanying drawings.

BEST MODE FOR CARRYING OUT THE INVENTION

Figure 1:
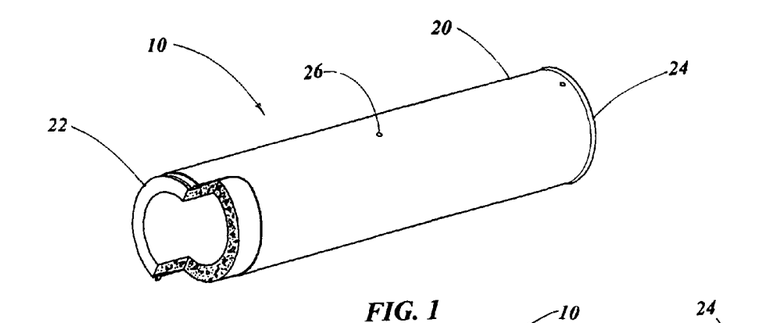
FIG. 1 is a partial isometric view of the preferred embodiment.
Figure 2:
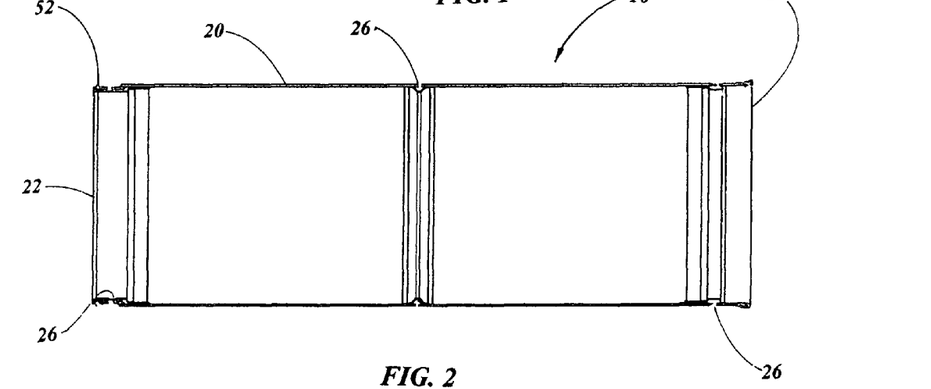
FIG. 2 is a cross sectional view taken along an imaginary center line of FIG. 1, less the cast concrete tube.
Figure 3:
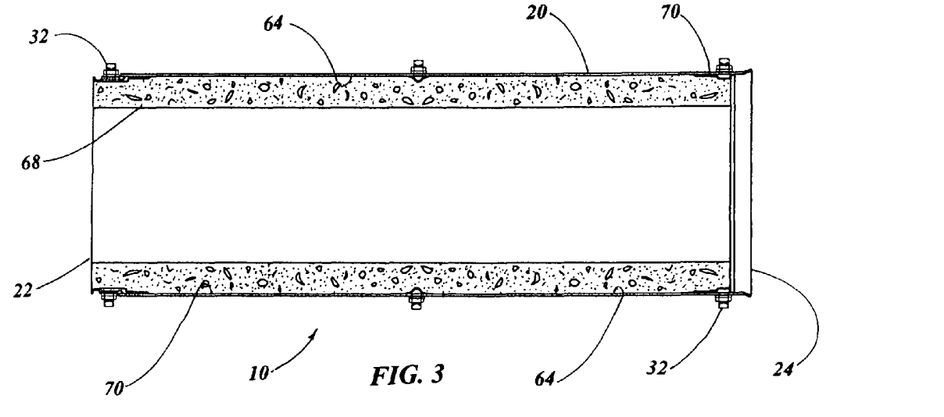
FIG. 3 is a cross sectional view taken along an imaginary center line of FIG. 1 with the cast concrete tube in place.
Figure 4:
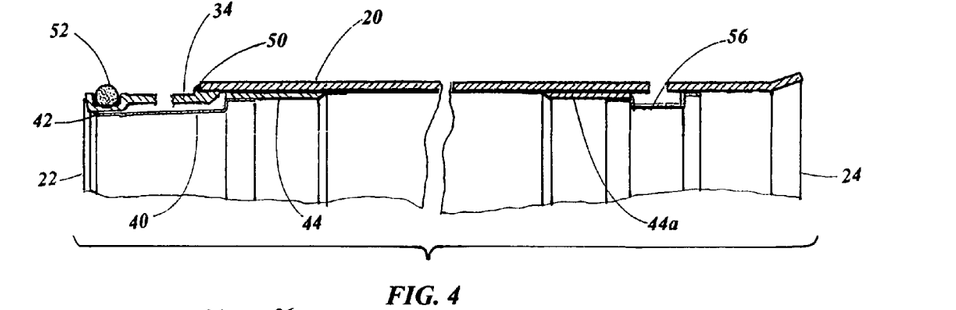
FIG. 4 is an enlarged partial cross sectional view taken along an imaginary center line of FIG. 1, less the cast concrete tube.
Figure 18:
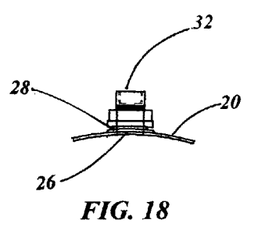
FIG. 18 is a view of an injection nozzle mounted on the metallic cylinder threaded injection hole with a welded saddle attachment for a thin wall cylinder.
Figure 19:
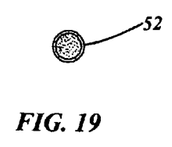
FIG. 19 is a cross sectional view taken along lines 19-19 of FIG. 16.
Figure 20:
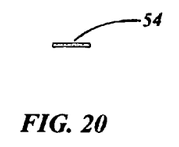
FIG. 20 is a cross sectional view taken along lines 20-20 of FIG. 17.
Figure 21:
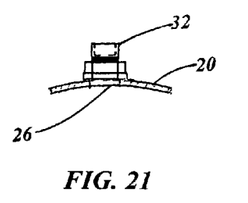
FIG. 21 is a view of an injection nozzle mounted on the metallic cylinder threaded injection hole.
Figure 30:
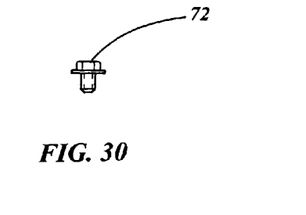
FIG. 30 is a side view of the plug.
Figure 34:
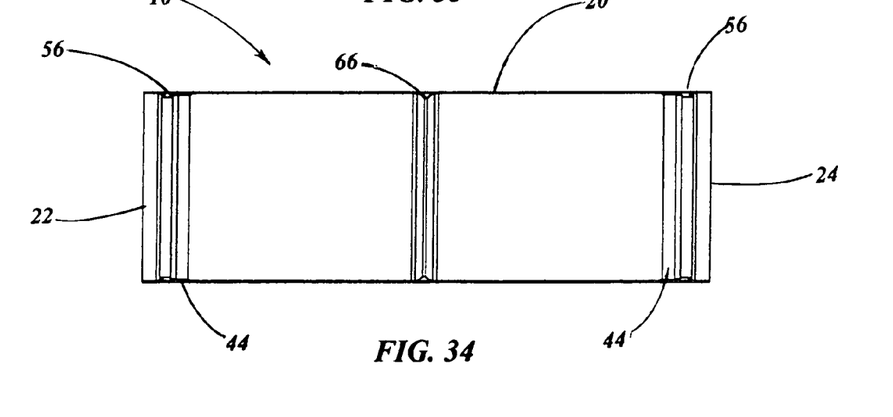
FIG. 34 is a cross sectional view taken along an imaginary center line of the second embodiment, less the cast concrete tube.

The best mode for carrying out the invention is presented in terms of a preferred and a second embodiment. The preferred embodiment is shown in FIGS. 1 thorough to 33 and the second embodiment is illustrated in FIG. 34. The preferred embodiment is comprised of a pre-stressed concrete pipe 10 which includes a metallic cylinder 20 with a first end 22, a belled second end 24, and a number of threaded holes 26 through the cylinder 20. The material of the metallic cylinder 20 is steel with the second end 24 belled in a flared shape as shown in FIGS. 1-3 or optionally a horizontal offset step, well known in the art. The threaded holes 26 are tapped directly into the cylinder 20 shown in FIG. 21, when the cylinder 20 is too thin; a reinforcing saddle 28 is welded over the threaded hole as illustrated in FIG. 18. When the threaded hole 26 used as an inlet hole it is closed with an injection nozzle 32, having an integral check valve, permitting the entry of a pressurized compound. When the threaded hole 26 is used as an outlet hole it may be plugged with a threaded plug 72, as illustrated in FIG. 30, after the air has escaped from the groove during the injection procedure using the pressurized compound.

A rolled annular ring 34 is provided in the invention that incorporates an annular ring threaded hole 36 therein, along with an integral cup shaped O-ring recess 38. The rolled annular ring is formed by rolling a hot rolled flat bar into the desired cross section on top and bottom.

Figure 5:
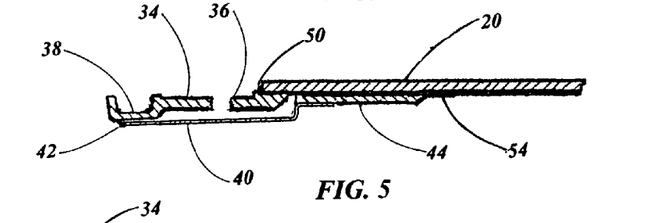
FIG. 5 is an enlarged partial cross sectional view of the first end of the metallic cylinder, less the cast concrete tube.
Figure 6:
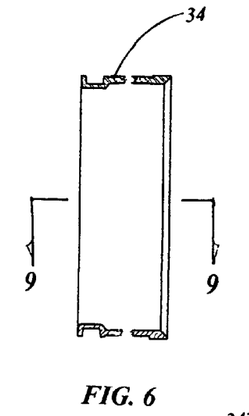
FIG. 6 is a cross sectional view taken along an imaginary center line of the rolled angular ring.
Figure 7:
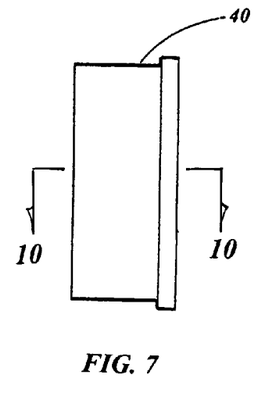
FIG. 7 is a cross sectional view taken along an imaginary center line of the joggled offset angular member.
Figure 8:
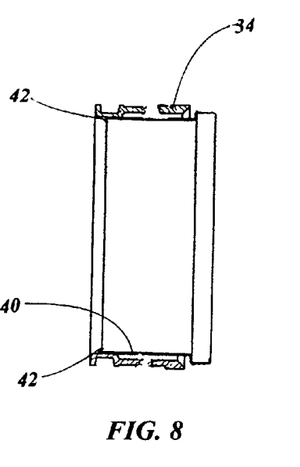
FIG. 8 is a cross sectional view of the joggled offset angular member welded to the rolled angular ring.
Figure 9:
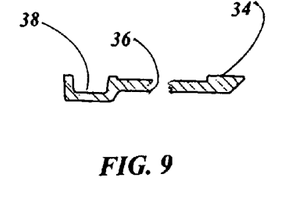
FIG. 9 is a cross sectional view taken along lines 9-9 of FIG. 6.
Figure 10:
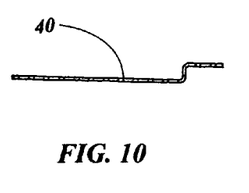
FIG. 10 is a cross sectional view taken along lines 10-10 of FIG. 7.

A joggled annular offset member 40 is positioned onto the inside diameter of the rolled annular ring 34 and attached with a first hermetic weld bead 42, as illustrated in FIGS. 5 and 8. The joggled annular offset member 40 is formed of metallic rolled sheet metal consisting steel.

Figure 11:
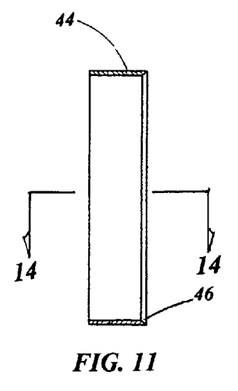
FIG. 11 is a cross sectional view taken along an imaginary center line of the first resilient seal band.
Figure 12:
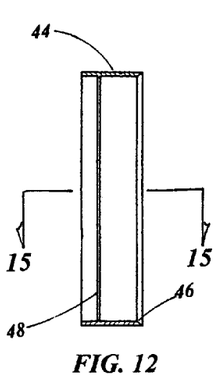
FIG. 12 is a cross sectional view taken along an imaginary center line of the alternate resilient seal band with the raised step.
Figure 13:
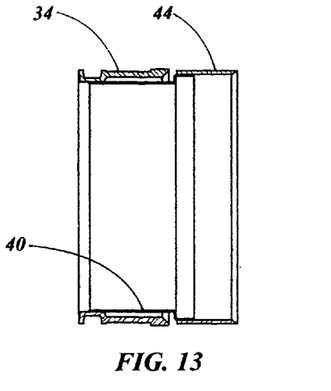
FIG. 13 is a cross sectional view taken along an imaginary center line of the first seal band stretched over and bonded to the joggled offset angular member which has been welded to the rolled angular ring.
Figure 14:
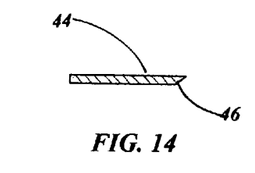
FIG. 14 is a cross sectional view taken along lines 14-14 of FIG. 11.
Figure 15:
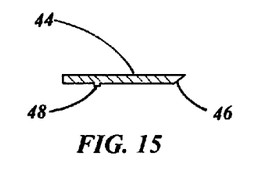
FIG. 15 is a cross sectional view taken along lines 15-15 of FIG. 12.
Figure 16:
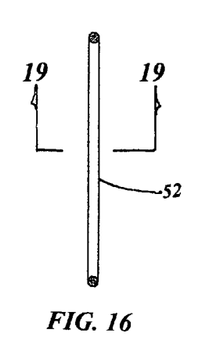
FIG. 16 is a cross sectional view taken along an imaginary center line of the O-ring seal.
Figure 17:
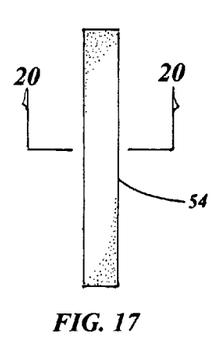
FIG. 17 is a view of the strip of pressure sensitive tape.
Figures 22, 23, 24, 25:
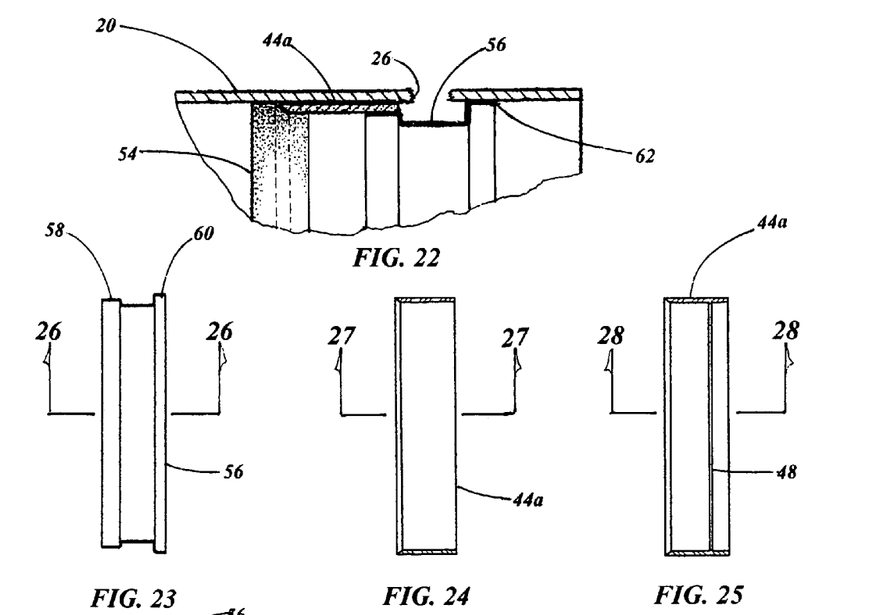
FIG. 22 is an enlarged partial cross sectional view of the second end of the metallic cylinder, less the cast concrete tube.
FIG. 23 is a cross sectional view taken along an imaginary center line of the angular formed hat member.
FIG. 24 is a cross sectional view taken along an imaginary center line of the second resilient seal band.
FIG. 25 is a cross sectional view taken along an imaginary center line of the alternate resilient seal band with the raised step.
Figure 28:
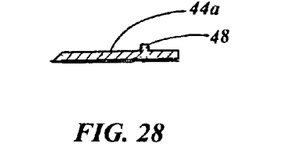
FIG. 28 is a cross sectional view taken along lines 28-28 of FIG. 25.

A first resilient seal band 44 is partially stretched over and bonded onto an inner portion of the joggled annular offset member 40, as depicted pictorially in FIG. 13. The first resilient seal band 44 is composed of a material such as neoprene, rubber, vinyl, nitrile, isoprene and chlorinated polyethylene and is bonded with a vulcanized joint, a chemical weld joint or an adhesive joint, however neoprene with a vulcanized joint is preferred. The first resilient seal band 44, shown individually in FIGS. 11 and 14, has a tapered distal edge 46 and may be a continuous band or with ends butting together to form the band. Alternatively a configuration of the seal band includes a raised step 48 for butting against the joggled annular offset member 40 as depicted in FIGS. 25 and 28.

The rolled annular ring 34, with the joggled annular offset member 40 welded thereunto along with first seal band 44 bonded on the joggled offset member 40, is placed within the metallic cylinder first end 22, as illustrated in FIGS. 1-5. A second hermetic weld bead 50 welds the rolled annular ring 34 to the metallic cylinder first end 22 and an O-ring seal 52 is positioned within the annular ring cup shaped O-ring recess 38, as illustrated in FIGS. 2-5. The O-ring seal 52 is made of Buna-N, ethylene propylene, Viton, Teflon, silicone or polyurethane.

A strip of waterproof pressure sensitive tape 54 is affixed to a distal end of the first resilient seal band 44 and simultaneously to the metallic cylinder 20 creating a seal therebetween preventing liquid concrete from flanking penetration.

The belled second end 24 of the metallic cylinder 20 is different than the first end 22 as it becomes the female end of the pre-stressed concrete pipe 10 into which the first end 22 is connected when individual sections of a pipe are joined together.

Figure 26:
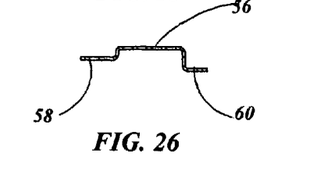
FIG. 26 is a cross sectional view taken along lines 26-26 of FIG. 23.
Figure 27:
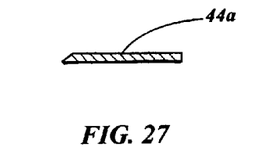
FIG. 27 is a cross sectional view taken along lines 27-27 of FIG. 24.

An annular formed hat member 56 has and a longitudinal inner portion 58 and a longitudinal outer portion, as illustrated in FIGS. 22, 23 and 26. The annular formed hat member 56 is formed of sheet metal consisting of steel.

Figure 29:
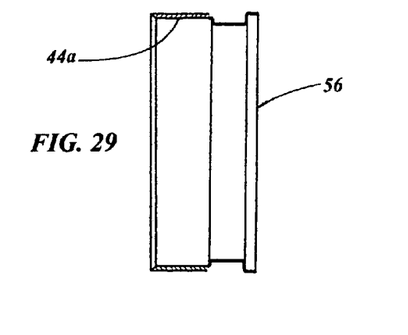
FIG. 29 is a cross sectional view taken along an imaginary center line of the second seal band stretched over and bonded to the angular formed hat member.

A second resilient seal band 44a is stretched over and bonded onto the inner portion 58 of the annular formed hat member 56, as shown in FIG. 29. The second resilient seal band 44a is the same as the first resilient seal band 44 including its configuration bonding and basic materials.

The annular formed hat member 56 with the second seal band 44a bonded thereto is positioned within the metallic cylinder adjacent to the second end 24 and in communication with at least one threaded hole 26, A strip of pressure sensitive tape 54 is affixed to a distal end of the second seal band 44a and simultaneously to the metallic cylinder 20, as depicted in FIG. 22. A third hermetic bead 62 attaches the annular hat member outer portion 60 to the metallic cylinder second end 24, as illustrated best in FIG. 22.

Figure 31:
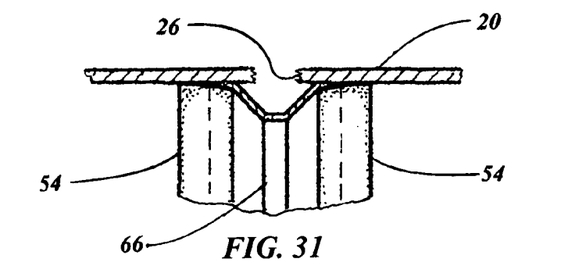
FIG. 31 is an enlarged partial cross sectional view of the middle of the metallic cylinder, less the cast concrete tube illustrating the intermediate angular channel.
Figure 32:
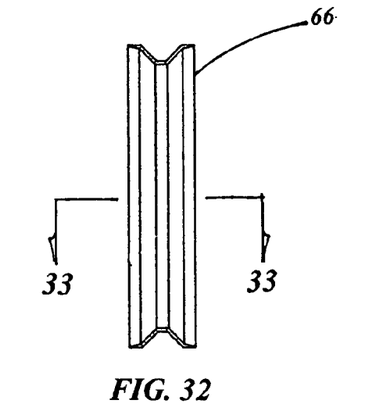
FIG. 32 is a cross sectional view taken along an imaginary center line of the intermediate angular channel.
Figure 33:
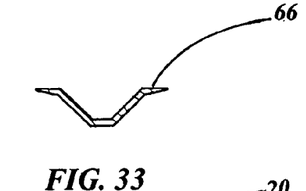
FIG. 33 is a cross sectional view taken along lines 33-33 of FIG. 32.

If the pre-stressed concrete pipe 10 is made relatively long it may be necessary to add one or more intermediate annular channels 66, as shown in FIGS. 31-33. The intermediate annular channel 66 is preferably made of a thermoplastic material or thermoset material; however other materials such as metal, fiberglass and carbon fiber may be used. In order to insure a liquid tight seal between the intermediate annular channel 66 and the metallic cylinder 20 a strip of pressure sensitive tape 54 is affixed to both the outer extending flanges of the intermediate annular channel 66 and to the inside diameter of the metallic cylinder 20, as illustrated in FIG. 31.

A film layer of release agent 64, shown in FIG. 3, is adhered to the metallic cylinder 20 on its inside diameter. The release agent 64 material consists of, but it is not limited to, silicon, polymer, wax and petroleum based substances.

A cast concrete tube 68, as illustrated in FIG. 3, is formed within the metallic cylinder 20 by any convenient method well known in the art. This method includes vertical gravity casting between the cylinder and a mandrel, or centrifugally-cast employing centrifugal force etc. all of which are standard practice in the industry.

A pressurized solidifying compound 70 is disposed through the injection nozzle 32 between the metallic cylinder 20 and the desiccated concrete tube 68 permitting the concrete tube 68 to remain constantly in a tangential compressed state after the compound 70 has permanently set. The pressurized solidifying compound 70 is preferably an epoxy resin or a mixture of epoxy and carbon nanotube; however other compounds having similar characteristics may be used with equal dispatch.

A method of making a pre-stressed concrete pipe is taught which comprise the steps of the following;

providing a metallic cylinder 20 with a first end 22, a belled second end 24, and also a rolled annular ring 34, welding with a first hermetic bead 42 to a joggled annular offset member 40 onto an inside diameter of said annular ring 34, stretching a first resilient seal band 44 partially over and bond onto an inner portion 58 of the joggled annular offset member 40, placing said annular ring 34, with the joggled annular offset member 40 and seal band 44 attached, within the metallic cylinder first end 22, welding a second hermetic bead 50 to said rolled annular ring 34 and said metallic cylinder first end 22, adhering a strip of pressure sensitive tape 54 to a tapered distal end 46 of said first resilient seal band 44 and simultaneously to said metallic cylinder 20, provide an annular formed hat member 56, stretching a second resilient seal band 44a over and bonding onto said annular formed hat member 56 longitudinal inner portion 58, positioning said annular formed hat member 56 with said second seal band 44a bonded thereto, within said metallic cylinder 20 adjacent to said cylinder second end 24, applying a strip of pressure sensitive tape 54 to a distal end of said second seal band 44a and simultaneously to said metallic cylinder 20, weld a third hermetic bead 62 to said annular formed hat member 56 and to said metallic cylinder second end 24, applying a film layer of release agent 64 adhered to said metallic cylinder 20 on an inside diameter thereof, casting a concrete tube 68 within said metallic cylinder 20, applying a pressurized solidifying compound 70 through the injection nozzle 32 between said metallic cylinder 20 and said concrete tube 68 such that said concrete tube 68 remains constantly in a tangential compressed state, and placing an O-ring seal 52 onto a seal ring recess 38 within said rolled annular ring 34, The second embodiment of the invention is illustrated in FIG. 34 and consists of the exact same elements on both ends as incorporated in the metallic cylinder second end 24 therefore it would be redundant to repeat the entire description. The drawing includes all of the major elements including the alternate intermediate angular channel 66. In this embodiment the ends of the metallic cylinder 20 are treated with the conventional attachment procedures that are well known in the art.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A pre-stressed concrete pipe comprising;
a metallic cylinder having a first end, a belled second end, and a plurality of holes through said cylinder,
a first shaped annular ring having a threaded hole therein,
a second shaped annular ring, having a groove therein, embracing an inside diameter of said first shaped annular ring,
a first hermetic weld bead attaching said second shaped annular ring to said first shaped annular ring,
a first resilient seal band bonded onto an inner portion of said second shaped annular ring,
said attached first and second shaped annular ring are positioned within said metallic cylinder first end,
a second hermetic weld bead connecting said first annular ring to said metallic cylinder first end, and
a third shaped annular ring,
a second resilient seal band bonded onto said third shaped annular ring,
wherein said third shaped annular ring and attached seal band is positioned within said metallic cylinder adjacent to said second end in communication with at least one metallic cylinder hole,
a third hermetic bead attach said third annular ring portion to said metallic cylinder second end,
a cast concrete tube within said metallic cylinder,
a pressurized solidifying compound disposed between said metallic cylinder and said concrete tube such that said concrete tube remains constantly in a tangential compressed state, and
an O-ring seal positioned within a first annular ring cup shaped O-ring recess.

2. A pre-stressed concrete pipe comprising;
a metallic cylinder having a first end, a belled second end, and a plurality of threaded holes through said cylinder,
a rolled annular ring having at least one threaded hole therein, with said rolled annular ring having an integral cup shaped O-ring recess,
a joggled annular offset member embracing an inside diameter of said rolled annular ring,
a first hermetic weld bead attaching said annular offset member to said rolled annular ring,
a first resilient seal band partially stretched over and bonded onto an inner portion of said joggled annular offset member,
said rolled annular ring, with said joggled annular offset member attached and said seal band bonded on said joggled offset member, is positioned within said metallic cylinder first end,
a second hermetic weld bead connecting said rolled annular ring to said metallic cylinder first end,
a strip of pressure sensitive tape affixed to a distal end of said seal band and simultaneously to said metallic cylinder,
an annular formed hat member having a longitudinal inner portion and a longitudinal outer portion,
a second resilient seal band stretched over and bonded onto said inner portion of said annular formed hat member,
wherein said annular formed hat member with said second seal band bonded thereto is positioned within said metallic cylinder adjacent to said second end in communication with at least one threaded hole,
a strip of pressure sensitive tape affixed to a distal end of said second seal band and simultaneously to said metallic cylinder,
a third hermetic bead attaching said annular hat member outer portion to said metallic cylinder second end, a film layer of release agent adhered to said metallic cylinder on an inside diameter thereof, a cast concrete tube within said metallic cylinder, a pressurized solidifying compound disposed between said metallic cylinder and said concrete tube such that said concrete tube remains constantly in a tangential compressed state, and an O-ring seal positioned within a annular ring cup shaped O-ring recess.

3. The pre-stressed concrete pipe as recited in claim 2 wherein said metallic cylinder material is steel.

4. The pre-stressed concrete pipe as recited in claim 2 wherein said metallic cylinder metallic cylinder belled on said second end is belled with a horizontal offset step.

5. The pre-stressed concrete pipe as recited in claim 2 wherein said metallic cylinder threaded holes have a welded attachment consisting of a saddle.

6. The pre-stressed concrete pipe as recited in claim 2 wherein said metallic cylinder threaded hole is closed with an injection nozzle having an integral check valve therein for permitting the entry of said pressurized solidifying compound between said metallic cylinder and said concrete tube.

7. The pre-stressed concrete pipe as recited in claim 2 wherein said joggled annular offset member further comprises rolled sheet metal.

8. The pre-stressed concrete pipe as recited in claim 2 wherein said joggled annular offset member is composed of steel material.

9. The pre-stressed concrete pipe as recited in claim 2 wherein said first resilient seal band seal band and said second resilient seal band is composed of a material selected from the group consisting of neoprene, rubber, vinyl, nitrile, isoprene and chlorinated polyethylene, and said first resilient seal band seal band and second resilient seal band is bonded with joining matter selected from the group consisting of a vulcanized joint, a chemical weld joint and an adhesive joint.

10. The pre-stressed concrete pipe as recited in claim 2 wherein said first resilient seal band seal band and second resilient seal band further having a tapered distal edge.

11. The pre-stressed concrete pipe as recited in claim 2 wherein said first resilient seal band and second resilient seal band are continuous with butt ends together forming said band.

12. The pre-stressed concrete pipe as recited in claim 2 wherein said first resilient seal band seal band and second resilient seal band alternatively include a raised step for butting against said joggled annular offset member.

13. The pre-stressed concrete pipe as recited in claim 2 wherein said O-ring seal material is selected from the group consisting of Buna-N, ethylene propylene, Viton, Teflon, silicone and polyurethane.

14. The pre-stressed concrete pipe as recited in claim 2 wherein said annular formed hat member further comprises a steel material.

15. The pre-stressed concrete pipe as recited in claim 2 wherein said pressure sensitive tape is waterproof.

16. The pre-stressed concrete pipe as recited in claim 2 wherein said release agent material is selected from the group consisting of silicon, polymer, wax and petroleum based substance.

17. The pre-stressed concrete pipe as recited in claim 2 wherein said pressurized solidifying compound is selected from the group consisting of epoxy resin and a mixture of epoxy resin and carbon nanotubes.

18. The pre-stressed concrete pipe as recited in claim 2 wherein said an intermediate annular channel consists of a material selected from the group consisting of thermoplastic and steel.

19. A method of making a pre-stressed concrete pipe comprising the steps of;

providing a metallic cylinder with a first end, a belled second end, and also a rolled annular ring having threaded holes therein, providing a joggled annular offset member, stretching a first resilient seal band partially over and bonding onto an inner portion of said joggled annular offset member, welding a first hermetic bead to said joggled annular offset member containing said first resilient seal band to an inside diameter of said annular ring, placing said rolled annular ring, with said joggled annular offset member attached, within said metallic cylinder first end, welding a second hermetic bead to said rolled annular ring and said metallic cylinder first end, adhering a strip of pressure sensitive tape to a distal end of said seal band and simultaneously to said metallic cylinder, providing an annular formed hat member, stretching a second resilient seal band over and bonding onto said annular formed hat member on a longitudinal inner portion thereof, positioning said annular formed hat member with said seal band bonded thereto within said metallic cylinder adjacent to said cylinder second end, welding a third hermetic bead to said annular hat member and to said metallic cylinder second end, applying a strip of pressure sensitive tape to a distal end of said seal band and simultaneously to said metallic cylinder, applying a film layer of release agent adhered to said metallic cylinder on an inside diameter thereof, casting a concrete tube within said metallic cylinder, applying a pressurized solidifying compound between said metallic cylinder and said concrete tube such that said concrete tube remains constantly in a tangential compressed state, and placing an O-ring seal positioned onto a seal ring cup within said rolled annular ring.

20. A pre-stressed concrete pipe comprising;

a metallic cylinder having a first end, a second end, and a plurality of threaded holes through said cylinder, an annular formed hat member having a longitudinal inner portion and a longitudinal outer portion, a first resilient seal band stretched over and bonded onto said inner portion of said annular formed hat member, wherein said annular formed hat member with said first resilient seal band bonded thereto is positioned within said metallic cylinder ends in communication with at least one threaded hole, and each annular formed hat member with said seal band bonded thereto is positioned adjacent to said cylinder first end and said second end, a first hermetic bead attach said annular hat member outer portion to said metallic cylinder first end and to said metallic cylinder second end, a strip of pressure sensitive tape affixed to a distal end of said second seal band and simultaneously to said metallic cylinder, a film layer of release agent adhered to said metallic cylinder on an inside diameter thereof, a cast concrete tube within said metallic cylinder, and a pressurized solidifying compound disposed between said metallic cylinder and said concrete tube such that said concrete tube remains constantly in a tangential compressed state.

\* \* \* \* \*